United States Patent [19]

Sato

[11] Patent Number: 4,513,930
[45] Date of Patent: Apr. 30, 1985

[54] FISHING REEL
[75] Inventor: Jun Sato, Sakai, Japan
[73] Assignee: Shimano Industrial Company Limited, Osaka, Japan
[21] Appl. No.: 602,266
[22] Filed: Apr. 23, 1984

Related U.S. Application Data
[63] Continuation of Ser. No. 374,742, May 4, 1982, abandoned.

[30] Foreign Application Priority Data
May 22, 1981 [JP]  Japan .................................. 56-78503

[51] Int. Cl.³ .............................................. A01K 89/02
[52] U.S. Cl. ..................................... 242/218; 242/220
[58] Field of Search ................... 242/84.1 R, 84.21 R, 242/211, 212, 213, 214, 217, 218, 219, 220, 221; 192/93 R, 93 C, 99 A

[56] References Cited
U.S. PATENT DOCUMENTS 3,910,528  10/1975  Copeland ............................ 242/216
3,916,715  11/1975  Covey ................................ 242/211 X
3,971,529   7/1976  Dörbandt ........................... 242/211
4,179,084  12/1979  Noda ................................. 242/220 X
4,281,808   8/1981  Noda .................................. 242/218

Primary Examiner—John Petrakes
Assistant Examiner—David Werner
Attorney, Agent, or Firm—Stevens, Davis, Miller & Mosher

[57] ABSTRACT

A fishing reel provided with a clutch operating mechanism having a clutch lever which moves forwardly to disconnect a clutch and moves backwardly through return protuberances rotated by turning a handle to thereby connect the clutch, in which the clutch lever movable forwardly and backwardly is supported to a body frame in relation of being swingable in a fixed range around a pivot extending in parallel to the rotation axis of return protuberances and a torsion spring is interposed between the clutch lever and the body frame to bias the clutch lever in one direction of its swinging motion and invert the direction of biasing the clutch lever on the way of its forward movement, and an engaging portion at the utmost end of clutch lever, during the forward movement thereof, shifts radially inwardly with respect to each return protuberance, thereby enabling the clutch lever to move forwardly without hindrance of any return protuberance.

7 Claims, 5 Drawing Figures

FISHING REEL

This application is a continuation of application Ser. No. 374,742 filed 5/4/82, abandoned.

FIELD OF THE INVENTION

This invention relates to a fishing reel, and more particularly to a fishing reel which is provided with a body frame, a spool, a drive mechanism having a handle, a clutch for transmitting a driving force from the drive mechanism to the spool, and a clutch operating mechanism, so that a clutch lever therein is forwardly moved to disconnect the clutch and the handle is turned to rotate return protuberances to move the clutch lever backwardly to thereby connect the clutch.

BACKGROUND OF THE INVENTION

This kind of fishing reel generally operates the clutch lever or rotates the return protuberance at a return plate, thereby disconnecting or connecting the clutch. The clutch lever, when moved forwardly to disconnect the clutch, may be hindered from its movement by any return protuberance which is positioned occasionally on the path of movement of the clutch lever due to a position where the handle stops, thereby creating a problem of a dull cutoff of the clutch.

In order to solve the above problem, a fishing reel has heretofore been proposed which has the return plate rotatable in a certain restricted stroke relative to an input shaft rotated by the handle so that the clutch lever moves the return plate within the above stroke to avoid the hindrance of the return protuberance, or which pivots a pawl on the utmost end of the clutch lever through a spring so that the pawl swings to avoid the obstructive protuberance, thereby allowing the clutch lever to complete its forward movement.

Both of the above reels, however, are complicated in construction and expensive to produce and especially the former reel will generate noise because of play between the return plate and the input shaft and the latter has an increased number of parts and is troublesome to assemble.

SUMMARY OF THE INVENTION

An object of the invention is to provide a fishing reel which is simple in construction and has a reduced number of parts, and which ensures forward movement of the clutch lever even when any return protuberance is positioned on the path of the movement of a leg of clutch lever, thereby quickly disconnecting the clutch to allow a spool to freely rotate.

The fishing reel of the invention is provided with a body frame, a spool journalled thereto and having a spool shaft, a drive mechanism driving the spool and having a handle, a clutch for cutting off a driving force transmitted from the drive mechanism to the spool, and a clutch operating mechanism provided with a clutch lever to disconnect the clutch and with return protuberances which rotate together with the handle and move the clutch lever backwardly to connect the clutch, the clutch lever being supported forwardly and backwardly movably to the frame and swingably around an axis parallel to the rotation axis of the return protuberances and being provided at the utmost end in the direction of forward movement with an engaging portion engageable with the respective return protuberances, the clutch operating mechanism providing a torsion spring which biases the clutch lever to swing and inverts the direction of biasing the lever from moving the engaging portion away from the return protuberance to moving it toward the same, so that the engaging portion is moved radially inwardly with respect to each return protuberance, thus always ensuring the disconnection of the clutch through forward movement of the clutch lever.

In the fishing reel of the invention constructed as foregoing, the clutch lever, when no return protuberance is positioned on the path of movement of the lever, can of course move forwardly without hindrance, and even when any one of the return protuberances is positioned on the path, is swingable in a restricted range to avoid interference of the engaging portion with the return protuberance. Furthermore, the engaging portion, which is biased by a torsion spring radially inwardly of a return plate having the return protuberances, merely abuts against the side surface of the obstructive protuberance so that the clutch lever can move forwardly without hindrance.

Hence, the clutch lever can move forwardly regardless of any position of each return protuberance, thereby performing quick disconnection of the clutch to allow the spool to freely rotate.

When the handle, during the free rotation of the spool, is turned to rotate the obstructive return protuberance, the engaging portion at the clutch lever biased by the torsion spring enters into the path of rotation of each return protuberance so that the clutch lever is hit by the subsequent protuberance to be moved reliably backwardly, thereby connecting the clutch to rotate the spool by the handle.

Therefore, the fishing reel of the invention is simple in construction such that only the torsion spring is provided to keep the clutch level swingable in a fixed range, thereby saving a number of parts, lowering the manufacturing cost, and having less trouble.

These and other objects of the invention will become more apparent in the detailed description and examples which follow.

BRIEF DESCRIPTION OF THE DRAWINGS

FIGS. 2 through 4 are partially omitted right side views of the FIG. 1 embodiment from which a cover is removed, in which FIG. 2 shows a clutch lever in condition of connecting a clutch, FIG. 3 shows the same in condition of disconnecting the clutch, and FIG. 4 shows how the same moves forwardly to disconnect the clutch.

DETAILED DESCRIPTION OF THE INVENTION

Figure 1:
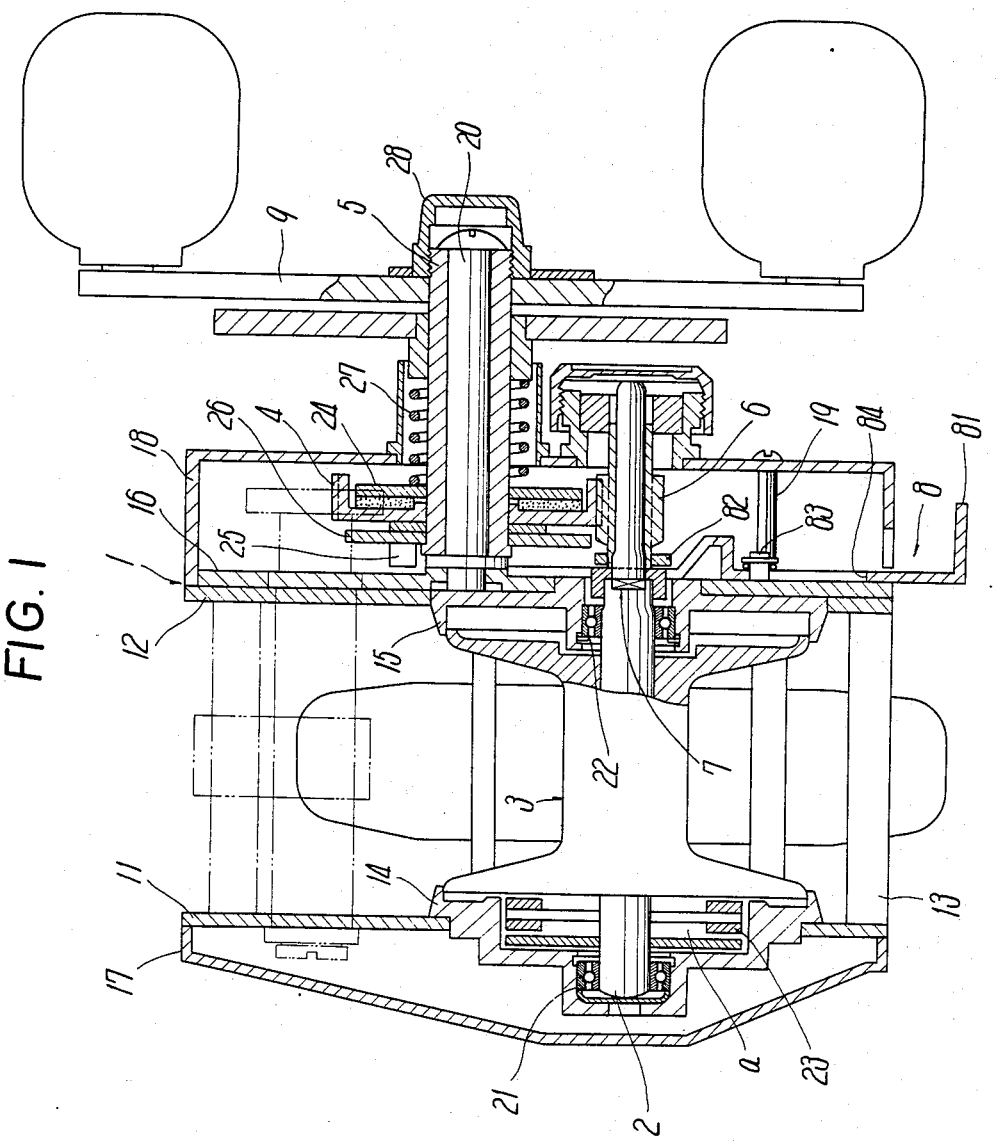
FIG. 1 is a sectional view of an embodiment of a fishing reel of the invention.

Referring to the drawings, a well-known double bearing fishing reel of a right-hand handle type is shown, which basically comprises a body frame 1, a spool 3 journalled thereto through a spool shaft 2, a handle shaft 5 carrying a master gear 4 and supported to the frame 1, a pinion 6 engageable with the master gear 4 and supported axially slidably to the spool shaft 2, and a clutch 7 provided between the pinion 6 and the spool shaft 2 and connected or disconnected by a clutch operating mechanism 8, so that the clutch 7 is connected to transmit a driving force from the handle shaft 5 rotated by a handle 9 to the spool shaft 2 through the master gear 4, pinion 6 and clutch 7 to thereby rotate the spool 3, or is disconnected to allow the spool 3 to freely rotate.

The body frame 1, as shown in FIG. 1, comprises a left side frame 11, a right side frame 12, and connecting rods 13 connecting both the frames 11 and 12. Bearing housings 14 and 15 are incorporated within the side frames 11 and 12 respectively, a side plate 16 is attached to the outside of right side frame 12, and covers 17 and 18 are attached to the outside of left side frame 11 and side plate 16 respectively, the side plate 16 and right side frame 12 being connected by fixing means, such as a plurality of bolts.

The bearing housings 14 and 15 have at the outer peripheries cylindrical portions each larger in diameter than the flange of spool 3 and at the centers bosses which incorporate ball bearings 21 and 22 for rotatably supporting the spool shaft 2 respectively.

The bearing housing 14 at the left side frame 11 is dish-like shaped and has a cavity a between the boss and the flange of spool 3. In addition, a centrifugal brake 23 is housed in the cavity a but it is not required for this invention.

The side plate 16 fixedly supports a rod 20 onto which the handle shaft 5 is rotatably sleeved, the handle shaft 5 carrying the master gear 4, a friction plate 24, and a return plate 26 which has a plurality of return protuberances 25 and serves also as an anti-reverse-rotation plate.

The handle 9, handle shaft 5, master gear 4 and pinion 6, constitute a drive mechanism for the spool 3. The friction plate 24 and return plate 26 are fitted onto the handle shaft 5 and rotate together therewith, the master gear 4 is fitted freely onto the handle shaft 5, and the friction plate 24 press-contacts with the master gear 4 through a spring 27 so that a driving force is transmitted from the handle shaft 5 to the master gear 4 through the friction plate 24. In addition, an adjuster 28 at one axial end of handle shaft 5 can adjust a contacting force of the friction plate 24.

The clutch 7 comprises flat faces provided at an axially intermediate portion of spool shaft 2 and a cylindrical portion of a not-round inner surface engageable with the flat faces. The cylindrical portion disengages from the flat faces by the clutch operating mechanism 8, thereby disconnecting the clutch 7 to allow the spool 3 to freely rotate.

The clutch operating mechanism 8 comprises a forklike shaped clutch lever 81, a clutch yoke 82 carrying the pinion 6, and the return protuberances 25. The clutch lever 81 is supported to the side plate 16 in relation of being forwardly and backwardly movable perpendicular to the spool shaft 2 through a pin 83 provided at the side plate 16 and an elongate slot 84 at the clutch lever 81, and is moved forwardly to disconnect the clutch 7 and backwardly by means of the rotation of return protuberance to connect the same.

In the fishing reel of the invention constructed as abovementioned, the clutch lever 81 is supported to the body frame 1 swingably in a fixed range around the pin 83 extending in parallel to the rotation axis of return protuberances 25, a torsion spring 85 is interposed between the clutch lever 81 and the frame 1 so as to bias the clutch lever 81 in one direction of swinging motion thereof and invert the direction of biasing the clutch lever 81 on the way of its movement, and an engaging portion 81$b$ provided at the utmost end of clutch lever 81 and engageable with each return protuberance 25 is moved radially inwardly of the return plate 26 during the forward movement of clutch lever 81.

Figure 3:
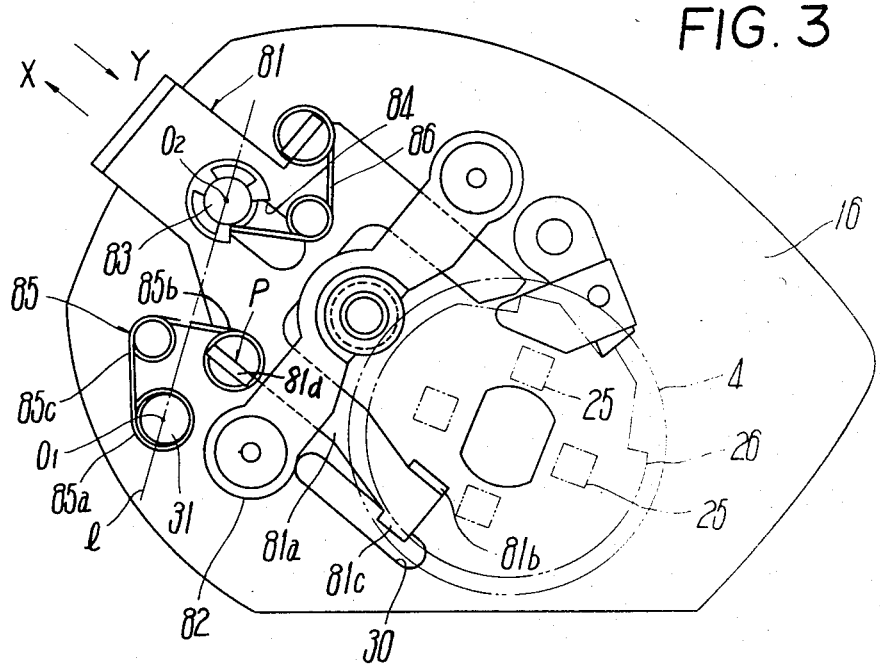
Figure 4:
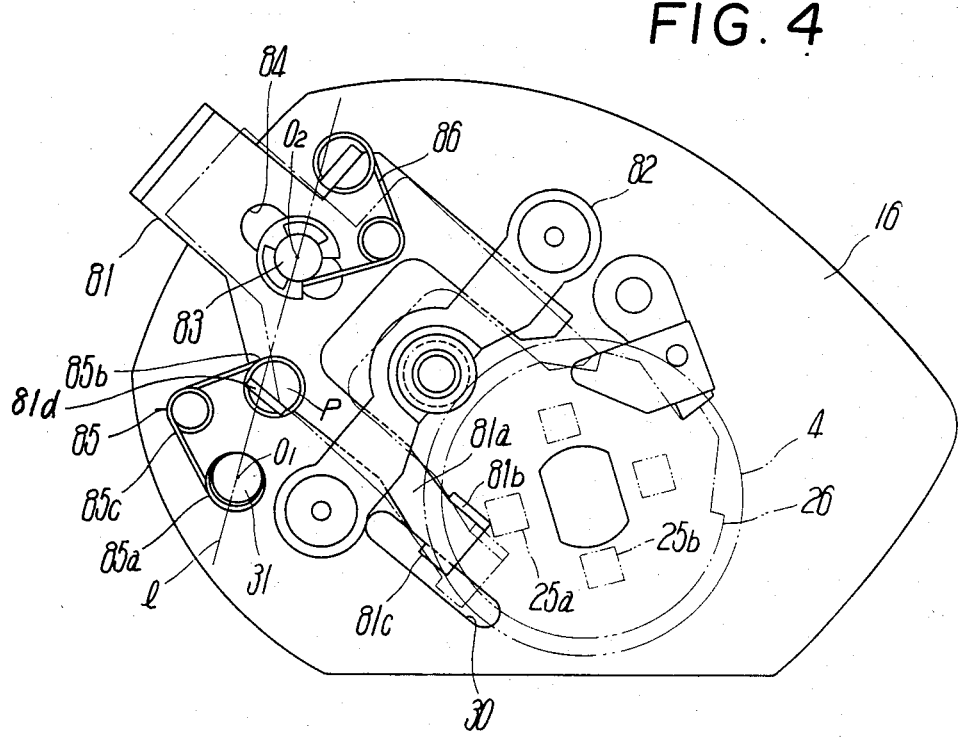
Figure 5:
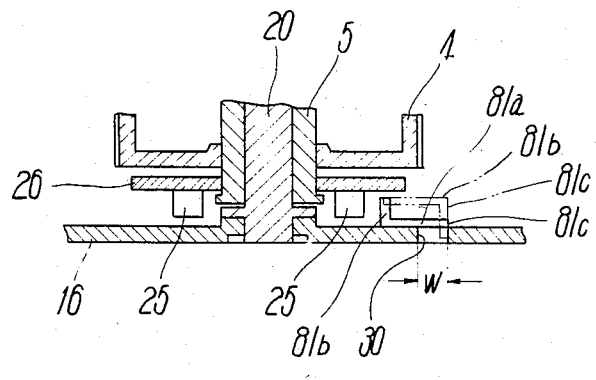
FIG. 5 is a sectional view of a principal portion of the invention.

In detail, in an embodiment shown in FIGS. 1 through 5, each return protuberance 25 is formed in a square and the clutch lever 81 is formed of a metallic plate and is, as shown in FIG. 5, bent at both widthwise ends in the opposite direction to each other to thereby integrally form the aforesaid engaging portion 81$b$ and a guide 81$c$ and has at the root a support 81$d$ for the spring 85. The side plate 16 is provided with a guide groove 30 which has the predetermined width W, extends along the path of movement of guide 81$c$, and engages with the guide 81$c$. The groove 30 and guide 81$c$ constitute a restricting means which restricts the swinging motion of clutch lever 81 only in the predetermined width W of groove 30 through the guide 81$c$ engaging therewith.

The torsion spring 85 comprises a pair of support portions 85$a$ and 85$b$ and an elastic portion 85$c$ interposed therebetween, the support portion 85$b$ is supported rotatably to the support 81$d$ at the root of one leg 81$a$ and that 85$a$ similarly to a stem 31 projecting from the side plate 16. When the clutch lever 81 moves backwardly in the direction of the arrow X in FIG. 2 in order to connect the clutch 7 and reaches the terminate of this movement, the center P of the support portion 85$b$ is allowed to be positioned opposite to the return protuberances 25 beyond the phantom line 1 in FIG. 2 connecting a pivot point $O_1$ for supporting portion 85$a$ to the side plate 16 and a pivot point $O_2$ of pin 83. Hence, the torsion spring 85 biases the leg 81$a$ clockwise around the pin 83 and the lever 81 as a whole in the direction of the arrow X.

Figure 2:
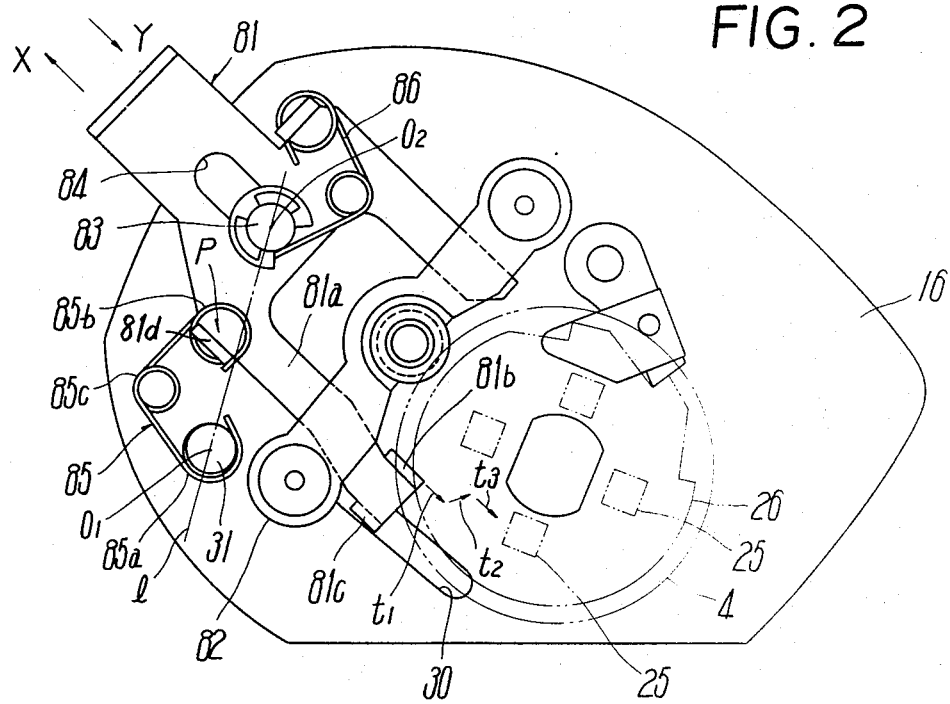

When the clutch lever 81 in the above condition is forwardly moved in the direction Y in FIG. 3, the support center P shifts beyond the line 1 in the direction of the arrow Y so as to be positioned at the return protuberance side with respect to the line 1. In brief, the torsion spring 85 is turned to shift the center P beyond the line 1 in the direction of the arrow Y on the way of forward movement of clutch lever 81 in the same direction, thereby biasing the leg 81$a$ counterclockwise around the pin 83. As a result, the engaging portion 81$b$ moves radially inwardly of the return plate 26 as shown in the arrow $t_2$ in FIG. 2 and the lever 81 as a whole is biased in the direction of the arrow Y.

Now, when an angler intends to draw out a fishing line from the spool 3 for the casting, he moves clutch lever 81 forwardly to disconnect the clutch 7 to thereby allow the spool 3 to freely rotate.

At this time, the engaging portion 81$b$, when no return protuberance is positioned on the path of movement of the leg 81$a$, moves, without hindrance, as shown by the arrows $t_1$ to $t_3$ in FIG. 2.

In detail, when the support center P is positioned at the opposite side to the return protuberances 25 with respect to the line 1, the clutch lever 81 is biased clockwise around the pin 83 by the torsion spring 85, in turn the leg 81$a$ is biased in the same direction, so that the engaging portion 81$b$ is kept away from each return protuberance and moves straight as shown by the arrow $t_1$ in FIG. 2 while being guided by the guide 81$c$ engaging with the groove 30.

When the center P shifts beyond the line 1 toward the return protuberances, the torsion spring 85 is inverted to bias the leg 81$a$ counterclockwise around the pin 83, in turn the engaging portion 81b moves in the predetermined range radially inwardly of return plate 26 as shown by the arrow t₂ in FIG. 2. Thereafter, the engaging portion 81 b moves straight approaching one return protuberance 25 in the direction of the arrow t₃ in FIG. 2 by virtue of the action of spring 85 and stops at the position as shown in FIG. 4, thereby disconnecting the clutch 7.

On the other hand, in a case that one return protuberance 25 is positioned in the path of movement of engaging portion 81b as shown by the arrows t₁ to t₃ in FIG. 2 and, for example, the engaging portion 81b moves radially inwardly to hit the one return protuberance 25 as shown by the solid line in FIG. 4, the engaging portion 81b merely slides along the side surface of return protuberance, thereby shifting against the torsion spring 85 from the position shown by the solid line to that by the tow-dot chain line in FIG. 4, thus disconnecting the clutch 7.

Hence, the clutch lever 81 ensures its forward movement regardless of any position of the one return protuberance 25 and is held by the torsion spring 85 in the terminate of forward movement to keep the clutch 7 in a stable disconnection condition.

Next, in condition of holding the clutch lever 81 as shown by the two-dot chain line in FIG. 4, when the handle 9 is turned for winding a fishing line on the spool 3, one return protuberance 25a having been in contact with the engaging portion 81b rotates away therefrom, at which time the leg 81a swings counterclockwise around the pin 83 by virtue of spring 85 and shifts to the position as shown in FIG. 3 and then the subsequent return protuberance 25b hits the leg 81a, whereby the clutch lever 81 moves backwardly in the direction of the arrow X and the torsion spring 85 is inverted to ensure the complete backward movement of clutch lever 81 and connection of the clutch 7 in a stable condition.

Alternatively, the leg 81a may be bent at the utmost end in L-like shape in section as shown in the two-dot chain line in FIG. 5 to form an engaging portion 81b at one bent portion and a guide 81c at the other. Also, a return spring 86, as shown in FIGS. 2 through 4, may be used together with the torsion spring 85 for the backward movement of clutch lever 81.

As seen from above, the fishing reel of the invention has the engaging portion which is controlled in its radially inward movement with respect to the return protuberance so that, even when any return protuberance is positioned in the path of movement of the leg of the clutch lever, the clutch lever performs its forward movement and quick disconnection of the clutch.

While a preferred embodiment of the invention has been described using specific terms, such description is for illustrative purpose only, and it is to be understood that changes and variations may be made without departing from the spirit or scope of the invention which is defined in following claims.

What is claimed is:

1. A fishing reel comprising,
a body frame,
a spool journalled to said frame and having a spool shaft,
a drive mechanism driving said spool and having a handle,
a clutch for interrupting a driving force transmitted from said drive mechanism to said spool, and
a clutch operating mechanism comprising a clutch lever which operates to disconnect said clutch, and return protuberances which rotate together with said handle to return said clutch lever to thereby connect said clutch, said clutch lever at said operating mechanism being supported to said frame in relation of being forwardly and backwardly movable and swingable around an axis which is parallel to a rotation axis of said return protuberances, said clutch lever for disconnecting said clutch having, at an utmost end in the direction of forward movement thereof an engaging portion which is non-movable relative to said clutch lever and which is engageable with each of said return protuberances, said clutch operating mechanism further comprising a torsion spring which biases said clutch lever in the swinging direction thereof and inverts the direction of biasing said clutch lever, during its forward movement, from moving said engaging portion away from each of said return protuberances to moving said engaging portion toward each of said return protuberances, and a restriction means for restricting a range of swinging motion of said clutch lever and comprising a guide groove having a width and a guide piece entering said groove, said torsion spring and restriction means coacting so that said engaging portion, when said clutch lever moves forwardly, is moved by action of said torsion spring on said lever step-wise radially inwardly from the radial outside with respect to each of said return protuberances, placing said engaging portion in the path of movement of said protuberances.

2. A fishing reel according to claim 1, wherein said torsion spring is provided with a pair of support portions and and elastic portion interposed therebetween, said clutch lever and body frame having respective support members for supporting said support portions respectively, said support portions at said torsion spring being supported rotatably to said support members respectively so that said clutch lever member is positioned at the return protuberance side with respect to a line connecting the center of said body frame support member and a center of swinging motion of said clutch lever when said clutch lever reaches the termination of its forward movement, and is positioned at the opposite side to said return protuberances when said clutch lever reaches the termination of its backward movement.

3. A fishing reel according to claim 2, wherein said clutch lever is formed of a plate so that said engaging portion and clutch lever support member are formed by bending said plate and are integral therewith.

4. A fishing reel comprising:
a body frame,
a spool journalled to said frame and having a spool shaft,
a drive mechanism for driving said spool and having a handle,
a clutch for interrupting a driving force transmitted from said drive mechanism to said spool, and
a clutch for interrupting a driving force transmitted from said drive mechanism to said spool, and
a clutch operating mechanism comprising a clutch lever which operates to disconnect said clutch, and return protuberances which rotate together with said handle to return said clutch lever to thereby connect said clutch, said clutch lever being supported to said frame in relation of being forwardly and backwardly moveable and swingeable around an axis which is parallel to a rotation axis of said return protuberances, said clutch lever for disconnecting said clutch having, at an utmost end in the direction of forward movement thereof, an engaging portion which is non-movable relative to said clutch lever and which is engageable with each of said return protuberances, said clutch operating mechanism further comprising a torsion spring which biases said clutch lever in the swinging direction thereof and inverts the direction of biasing said clutch lever, during its forward movement, from moving said engaging portion away from each of said return protuberances to moving said engaging portion toward each of said return protuberances, and a restriction means for restricting a range of swinging motion of said clutch lever and comprising a guide groove formed at said body frame and a guide piece formed at said clutch lever entering said groove, said torsion spring and restriction means coacting so that said engaging portion, when said clutch lever moves forwardly, is moved by action of said torsion spring on said lever step-wise radially inwardly from the radial outside with respect to each of said return protuberances, placing said engaging portion in the path of movement of said protuberances.

5. A fishing reel according to claim 4, wherein said clutch lever is formed of a plate so that said engaging portion and guide piece are formed by bending said plate and are integral therewith.

6. A fishing reel according to claim 5, wherein said engaging portion and guide piece provided integrally with said clutch lever are formed by bending both sides of the utmost end of said clutch lever in the opposite direction to each other.

7. A fishing reel according to claim 5, wherein said engaging portion and guide piece provided integrally with said clutch lever are formed by bending the utmost end of said clutch lever in L-like shape in section so that one bent portion is formed in said engaging portion and the other in said guide piece.

* * * * *